United States Patent [19]

Berthold

[11] Patent Number: 5,518,701
[45] Date of Patent: May 21, 1996

[54] METHOD AND APPARATUS FOR PURIFICATION OF GASES IN PARTICULAR EXHAUST GASES

[76] Inventor: Herman Berthold, Hintere Strasse 127, DE-8510 Furth, Germany

[21] Appl. No.: 27,156

[22] PCT Filed: Jul. 4, 1992

[86] PCT No.: PCT/EP92/01509

§ 371 Date: Jul. 7, 1993

§ 102(e) Date: Jul. 7, 1993

[87] PCT Pub. No.: WO93/00980

PCT Pub. Date: Jan. 21, 1993

[51] Int. Cl.$^6$ .................... B01D 19/02; B01D 19/04
[52] U.S. Cl. .................... 423/210; 55/235; 55/237; 55/257.4; 95/155; 95/157; 95/219; 95/242; 96/176; 96/180; 422/190
[58] Field of Search .................... 95/150, 155, 157, 95/158, 242, 218, 219, 212; 96/176, 179, 180; 55/231, 233, 296, 235, 237, 238, 315, 257.4; 423/210; 422/177, 190, 211

[56] References Cited

U.S. PATENT DOCUMENTS

| | | | |
|---|---|---|---|
| 1,836,563 | 12/1931 | Webster et al. | 95/157 |
| 2,271,642 | 2/1942 | Holzwarth | 95/219 |
| 2,379,338 | 6/1945 | Bingman | 95/150 |
| 2,585,831 | 2/1952 | Petersen | 95/158 |
| 2,817,415 | 12/1957 | Sykes | 95/219 |
| 3,149,935 | 9/1964 | Jamison et al. | 95/218 |
| 3,155,472 | 11/1964 | Huppke | 96/179 |
| 3,390,076 | 6/1968 | Dubach | 96/180 |
| 4,000,992 | 1/1977 | Cole, Jr. | 95/150 |
| 4,003,724 | 1/1977 | Payne et al. | 95/150 |
| 4,111,670 | 9/1978 | DeMarco | 55/315 |

FOREIGN PATENT DOCUMENTS

| | | | |
|---|---|---|---|
| 3025671 | 2/1981 | Germany | |
| 3920321 | 1/1991 | Germany | |
| 1240435 | 6/1986 | U.S.S.R. | 96/176 |
| 1641385 | 4/1991 | U.S.S.R. | 96/176 |

*Primary Examiner*—Jay H. Woo
*Assistant Examiner*—Duane S. Smith
*Attorney, Agent, or Firm*—Robbins, Berliner & Carson

[57] ABSTRACT

The invention relates to a process and a corresponding plant for the purification of gases, in particular flue gases, using a foam-forming reaction medium with which dirty gas is contacted in a reaction chamber, in which the foam is broken after the reaction between dirty gas and the reaction medium, the reaction medium recovered by the breaking and the settling sludge are separately collected and the purified gas is withdrawn. This invention is intended to enable the substances removed from the gases to be purified to be separated, when dirty gas having a temperature of <60° C. is purified, by carrying out the defoaming in the reaction chamber, collecting dense foam formed by the defoaming and reaction medium mixed with water and gases beneath the dense foam, removing the dense foam and surface sludge from the reaction chamber by suction and holding them for gravity separation, carrying out a layering of the substances to be separated in a settling phase, and successively separating the individual layers.

15 Claims, 3 Drawing Sheets

METHOD AND APPARATUS FOR PURIFICATION OF GASES IN PARTICULAR EXHAUST GASES

BACKGROUND OF THE INVENTION

The invention relates to a process for purification of gases, in particular exhaust gases, and to apparatus for use in such a process.

A process of this type is used in the apparatus disclosed by DE 3920321. In this apparatus, sludge settles in the reaction chamber in a reaction medium receiver and is passed into a sludge receiver in which it is dried. The foam settling on the reaction medium is broken by a defoamer into liquid and purified gas. The liquid, which essentially comprises the reaction medium, is returned to the reaction chamber.

Although it is possible using this apparatus to achieve a substantial purification of the fed gases, the impurities contained therein are mixed with the sludge removed from the reaction chamber even after drying thereof.

The object of the invention is to create a process and a plant by means of which the substances removed from the gases to be purified can be separated.

SUMMARY OF THE INVENTION

According to the present invention, advantage is taken of the finding that the dense foam forming in the reaction chamber, which is deposited as a reaction medium mixture on the liquid surface in the sludge receiver, contains a considerable portion of the substances to be removed from the gases. This means that it is expedient to attempt to separate the substances contained in the sludge. For this purpose, gravity separation is carried out in a holding procedure. During this, the heavy constituents settle and can be fed to residue utilization. The light gas constituents are then subjected to layering. To this end, an additional reaction medium, inter alia, can be fed in. Both reaction media cause the individual substances to separate into layers and/or to settle. Subsequently, it is possible, depending on the specific gravity of the different substances, to conduct these away and to separate them and further process them.

BRIEF DESCRIPTION OF THE DRAWINGS

The invention is described below in an illustrative manner with reference to FIGS. 1 to 3, in which.

DESCRIPTION OF THE PREFERRED EMBODIMENTS

Figure 1:
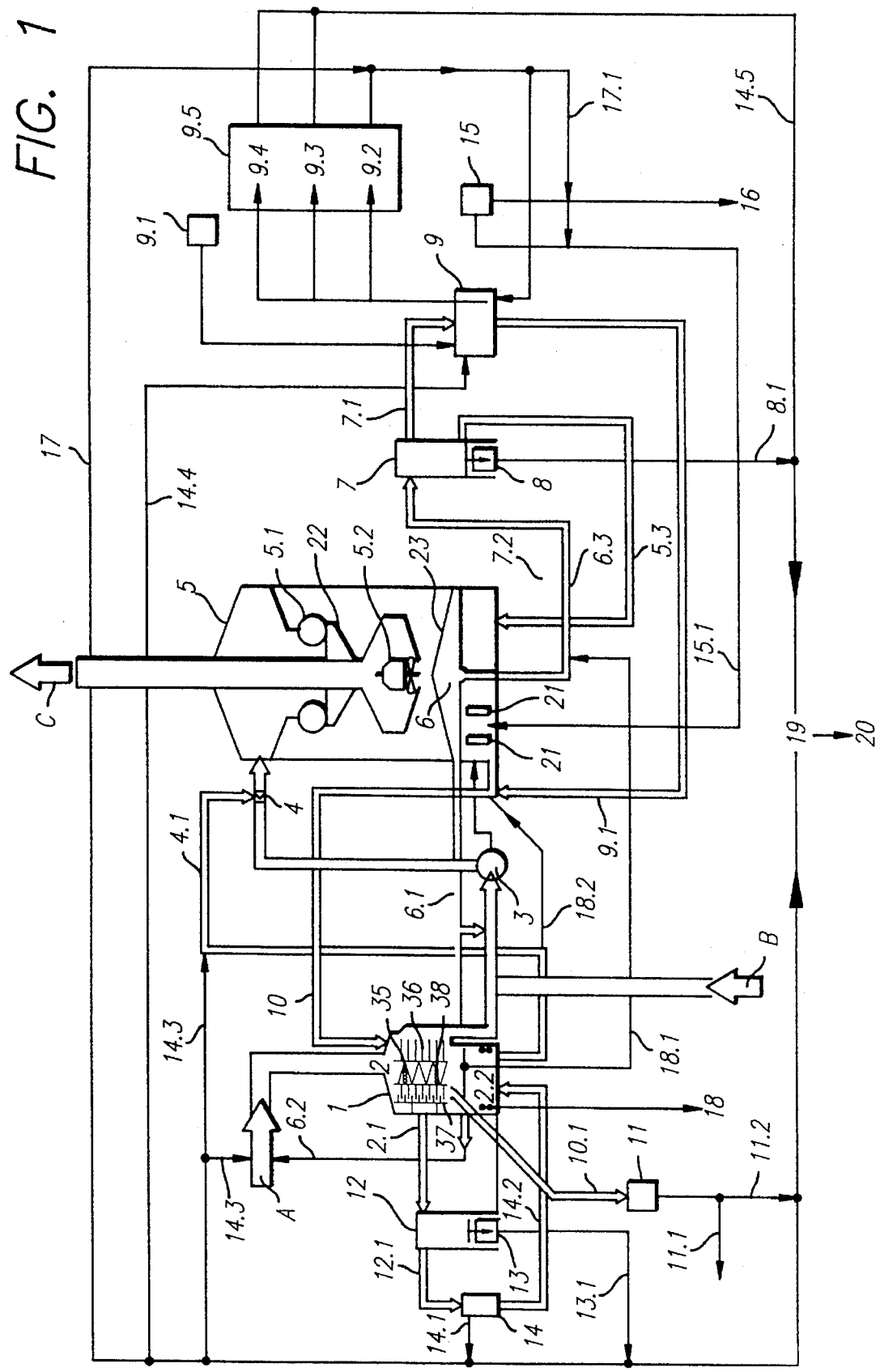
FIG. 1 shows a diagrammatic representation of a plant for carrying out the process according to the invention.

An essential improvement in the efficiency can be achieved by introducing liquid reaction medium and/or dense foam by means of a spraying device into the gases to be purified which are fed to the reaction chamber. Especially when gases are fed at a temperature above 60° C., a considerable improvement in the efficiency can be achieved here.

In the case of the abovementioned feeding of gases at elevated temperature, it is expedient to subject the sludge produced in the reaction chamber to a drying process. For this purpose, the sludge is fed to a multistage dryer into which the gases to be purified are introduced centrally and the sludge is distributed radially over the stages and transported downwards. It is also advantageous here to feed dense foam and accumulating liquid together with the reaction medium to the dryer reaction chamber via the dirty gas inlet.

In a process for the purification of gases, in particular flue gases, using a foam-forming reaction medium with which dirty gas is contacted in a reaction chamber, in which the foam is broken after the reaction between dirty gas and the reaction medium, the reaction medium recovered by the breaking and the settling sludge are separately collected and the purified gas is withdrawn, it is proposed according to the invention that, when dirty gas having a temperature of <60° C. is purified, the defoaming is carried out in the reaction chamber, dense foam formed by the defoaming and reaction medium mixed with water and gases beneath the dense foam are collected, the dense foam and surface sludge are removed from the reaction chamber by suction and held for gravity separation, layering of the substances to be separated is carried out in a settling phase, and the individual layers are successively separated.

One of the essential advantages of this process is that, as a result of the foam formation and subsequent defoaming, the substances to be removed from the gases and a portion of the gases themselves are present in the resulting dense foam and the sludge collecting below in the form of a solution (= a mixture of free substances), an emulsion (= the finest distribution of an insoluble, non-crystalline substance in a liquid), a dispersion (= the finest distribution of one or more substances in another) and/or a suspension (= the suspension of very finely divided substances in a liquid), which has a favorable effect on the separation of the substances.

This separation can also be promoted by introducing the reaction medium in concentrated form for pH regulation into the reaction medium accumulating in the reaction chamber.

When the reaction medium layer which is recovered in the layering is fed to the reaction medium in the reaction chamber, the reaction medium can be recovered and reused.

In certain cases, it is expedient to feed a further reaction medium during the settling phase, in which the layering is carried out, in order to separate further substances.

The substances obtained by the layering can be fed to residue utilization having a downstream recycling process or downstream disposal since they can be successively withdrawn from the purification process.

When reaction medium withdrawn from the reaction chamber is fed by spraying to the dirty gas introduced into the reaction chamber, intensive mixing of dirty gas and reaction medium is achieved even prior to the foam formation. The mixing can be further promoted by withdrawing dense foam from the reaction chamber and feeding it to the dirty gas introduced into the reaction chamber.

In the case of flue gases having a temperature > about 60° C. and drying of the sludge settling after reaction with the reaction medium, the heat energy of the dirty gas can be utilized by transporting the sludge in a dryer stagewise vertically from top to bottom and simultaneously contacting it with dirty gas fed to the dryer if dense foam from the dirty gas fed to the dryer is added.

If distillate formed in the dryer and the sludge treated in the dryer are withdrawn separately, a considerable prepurification of the dirty gases is already achieved before these are contacted with the reaction medium with foam formation.

It is expedient also to feed sludge to the dryer simultaneously with the dense foam from the reaction chamber so that a liquid exchange occurs between dryer and reaction chamber.

The light substances which are obtained by the gravity separation in layers are predominantly terpenes which are expediently returned to the purification process. These substances can either be fed to the dryer or to the reaction chamber or downstream stages.

In the defoamer, a mechanical defoaming is carried out into purified gas leaving upwards and liquid settling downwards because of gravity and dense foam.

The plant expediently has beneath the defoamer a bottom collecting tray which is provided at the edge with throughholes and which is connected to the housing of the defoamer via outlet pipes. This bottom collecting tray isolates the reaction chamber so that the dense foam accumulating on the liquid is not sucked back by the defoamer fan.

The bottom collecting tray is expediently arched upwards in order to prevent an accumulation of substances.

The plant expediently has a separating device for the layer-by-layer discharge of the layers formed by the reaction medium, a measuring device to measure the specific gravity of each layer discharged, and a rinsing device to rinse the separating device after the discharge of a layer. This device is of particular importance since the substances removed from the gases can be separately withdrawn from it.

The suction fan advantageously has a rotor having rotor blades tangential to the direction of rotation. This design has the effect that a suction effect is produced on the rear side of the rotor blades and an acceleration effect on the front side so that the foam sucked in is accelerated outwardly in the direction of the rotor blades and is sucked in upwardly.

The rotor blades can be surrounded by guide baffles bent against the direction of rotation of the rotor, onto which the foam impacts so that intensive friction and braking and thus mechanical breaking of the foam into detergent liquid, dense foam and sludge occurs.

In order to prevent portions of the broken foam being entrained upwards, the guide baffles can be covered by crescent-shaped covering baffles.

The outlet pipes are expediently arranged at the ends of the guide baffles facing away from the rotor and are half cut away in this region so that they take up the broken foam and pass it into the receiver.

When gases having a temperature above 60° C. are purified, a multi-stage dryer is expediently used having a central rotating pipe having a spiral guide baffle arranged therein for the dirty gas which is passed via outlet orifices in the rotating pipe onto the individual stage trays and having a stationary wiper which transports the sludge located on the stage trays downwards via orifices in the stage trays. This type of drying utilizes the heat energy of the dirty gas. However, a prereaction chamber is also created at the same time.

Deposition electrodes, which are reversible, are expediently provided in the reaction chamber in the region of the reaction medium for metal deposition and/or oxide deposition. As a result, numerous substances can be removed by electolytic deposition, but can also be reused for certain reactions by reversing the electrodes.

The plant can be designed as a mobile station mountable on a vehicle. If a dryer is present, this can be mountable on an additionally coupleable vehicle. As a result of this mobile design of the plant, trials can first be carried out, for example in production plants, to test the gases to be purified.

The process for the purification of gases is based on the technology of chemical/physical purification and exploits the interaction of physical, chemical, aerodynamic and hydrodynamic processes. The plant for application of this process is modular and is able to treat gases having a temperature below or above 60° C. The plant can be designed as a mobile station which is mountable on a vehicle; the dryer can be mountable on a separate coupleable vehicle.

Dirty gas having a temperature of below 60° C. is fed to the plant at B and passes via a suction fan 3 and a preliminary spray device 4 into the core of the apparatus, that is the scrubber 5. In this, the gas is forced over dynamic rollers 5.1 and contacted with a reaction medium specifically matched to the gas. The purifying foam resulting from this dynamic process represents a reaction medium of high surface area over which the substances to be separated contained in the gas are physically and chemically bound. Via a special defoamer 5.2 which is arranged in the outlet region of the scrubber 5 and which is described in more detail by means of FIGS. 2 and 3, the foam is returned into a liquid state and in the plant representing a closed system can be recirculated as reaction medium. The purified gas leaves via an outlet pipe at C. The reaction medium necessary for the purification process can be fed under control from a vessel 15 in concentrated form for pH regulation.

The foam formation is carried out in the scrubber 5 by the rollers 5.1 dipping into reaction medium located in an upper collecting tray 22 so that an intensive mixing and turbulence occurs between the fed gases and the reaction medium and thus foam formation occurs. The reaction medium recovered on breaking the foam in the defoamer 5.2 and bound to gas constituents is collected in a receiver 5.3. The receiver 5.3 is separated from the reaction chamber of the scrubber 5 via a bottom collecting tray 23, as is described in more detail by means of FIGS. 2 and 3.

Deposition electrodes 21, by means of which metals and/or oxide compounds contained in the gases to be purified can be deposited, can be provided inside or outside the receiver 5.3 of the scrubber 5 having connected throughflow vessels, in which the substances to be separated are present as a solution, emulsion, dispersion or suspension.

Using a suction apparatus 6, the dense foam and surface sludge are transferred via a line 6.3 into a reservoir tank 7 for intermediate holding.

Substances which are dissolved in the liquid reaction medium and have a higher specific gravity than that of the reaction medium used for the purification settle in a tank 8 and can be fed via a line 8.1 to residue utilization 19 and subsequent recycling 20 or, if desired, to disposal.

Substances which are bound in the reaction medium and are lighter or heavier than this are transferred as an emulsion, dispersion or suspension via a line 7.1 into a settling tank 9 in which the mixture is allowed to stand. The entrained reaction medium stabilizes in the settling tank 9 and can be returned to the purification process via a line 9.1 by introducing it into the receiver 5.3.

To recover raw materials contained in the settling tank 9, a further reaction medium can be fed to this from a reaction medium tank 9.1. Both reaction media produce, separately or together, a layering of the substances contained in the settling tank 9. A suction vessel 9.5 determines, by means of an appropriate measuring device, the specific gravity of each layer to be removed 9.2, 9.3 and 9.4 and more in the separating tank 9 and withdraws these. The substances thus obtained are then fed via a line 14.5 to residue utilization 19.

After each suction process, a rinsing process is carried out. The reaction medium produced during this with substances still present can be returned to the purification process via a line 17.1 and the line 15.1 or via the detergent concentrate tank 15 or else discharged via a line 16.

The residue and raw materials obtained from the separation in the suction vessel 9.5 can be supplied to appropriate enterprises for processing and/or producing new products or subjected to a recycling process, as indicated at 19. However, it is also possible to feed substances which can no longer be economically reprocessed to residual energy recovery via incineration, as indicated at 20, or to use them as a secondary product.

When gases having a temperature above 60° C. are purified, an additional drying process is economical. For this purpose, the plant described above is supplemented by a dryer 1. The dryer 1 is a multi-stage dryer, to the housing of which the gases to be purified are fed at A at the top. From there, they pass via a rotating pipe 2 furnished with a spiral guide baffle 35 and through-holes 38 and openings in this pipe onto stage trays 36 which interact with a stationary wiper 37 which transports sludge located on the stage trays downwards via orifices in these. The sludge located on the stage trays passes from the receiver 5.3 in the scrubber 5 via a line 10 into the dryer 1. The dried sludge, which is concentrated and/or dried with utilization of the heat contained in the fed gas, can be collected via a line 10.1 in a vessel 11 and fed via a line 11.1 to a combustion process or, via a line 11.2, to residue utilization 19. The distillate accumulating at the interior of the housing of the dryer 1 is fed via a line 2.1 to a vessel 12 in which substances such as metal oxides, inter alia, collect by gravity settling, can be trapped in a residue collection tank 13 and can be returned via a line 13.1 to residue utilization or, as indicated by the lines 14.3, 14.4 and 17, reaction substances can be returned to the purification process. The suction apparatus 6 of the scrubber 5 which feeds dense foam to the reservoir tank 7 is also connected via a line 6.1 to the dryer 1, so that liquid reaction medium accumulates therein in a receiver 2.2 which, at the same time, is also fed via a line 6.2 to the gases A to be purified. As a result of the various overflow and return lines which connect the scrubber 5 and the dryer 1, a defined liquid level is continuously maintained in both.

The lighter substances produced in the vessel 12, such as, for example, terpenes and reaction medium, are fed via a line 12.1 to a condensate tank 14. The entrained condensate water is passed via an equalizing line 14.2 into the dryer 1. The lighter substances are returned via a line 14.1 and the lines 14.3, 14.3 a) and 4.1, 14.4 and 17 to the purification process or pass to the residue utilization 19. Moreover, heat produced in the receiver 2.2 of the dryer 1 can be removed via a line 18. Substances from the liquid surface are supplied via a line 18.1 from the dryer 1. The sludge accumulatting in the receiver can be fed via a line 18.2 via a line 10 to the dryer.

Figure 2:
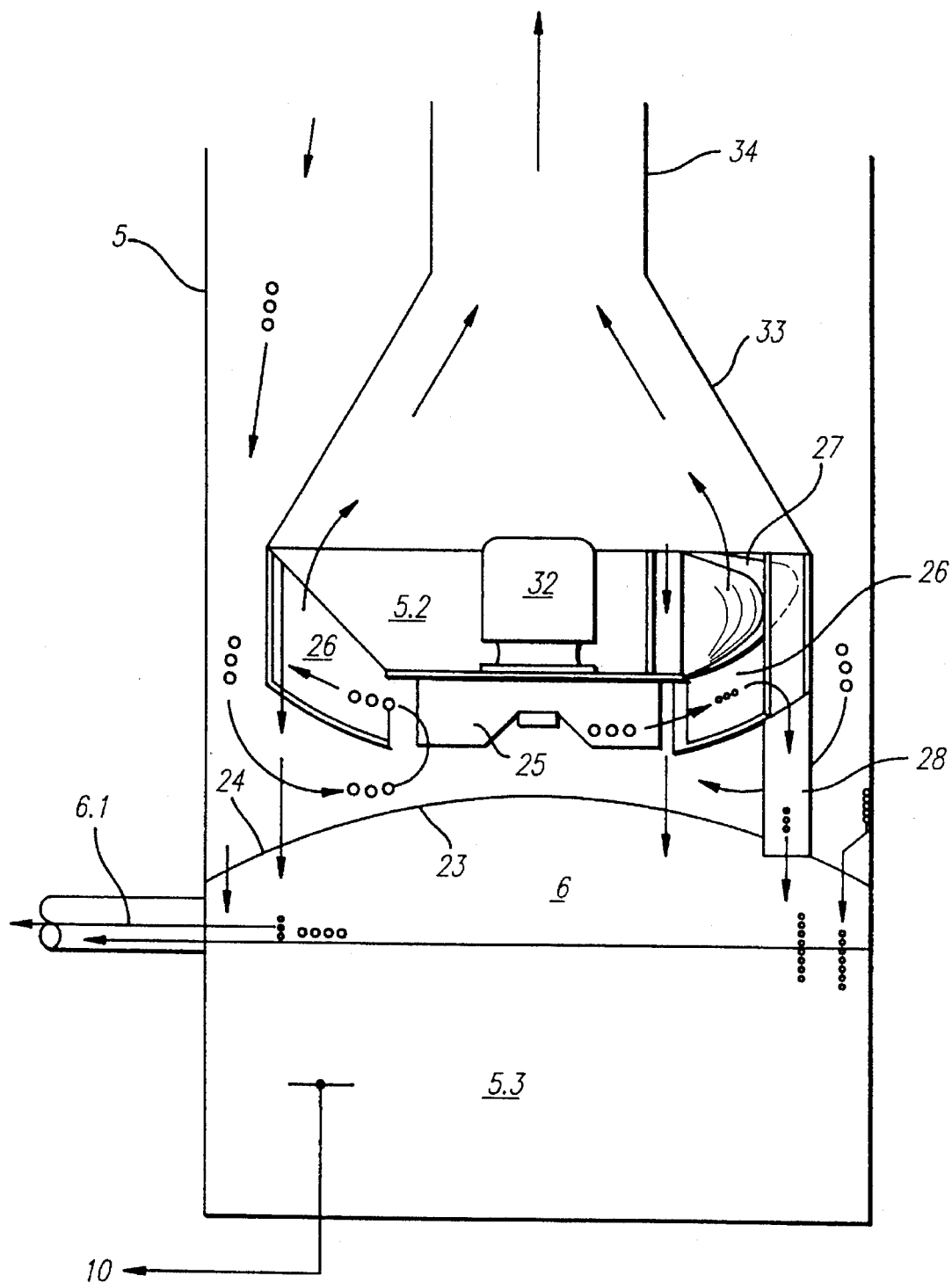
FIG. 2 shows a vertical section of the defoamer of the plant of FIG. 1.
Figure 3:
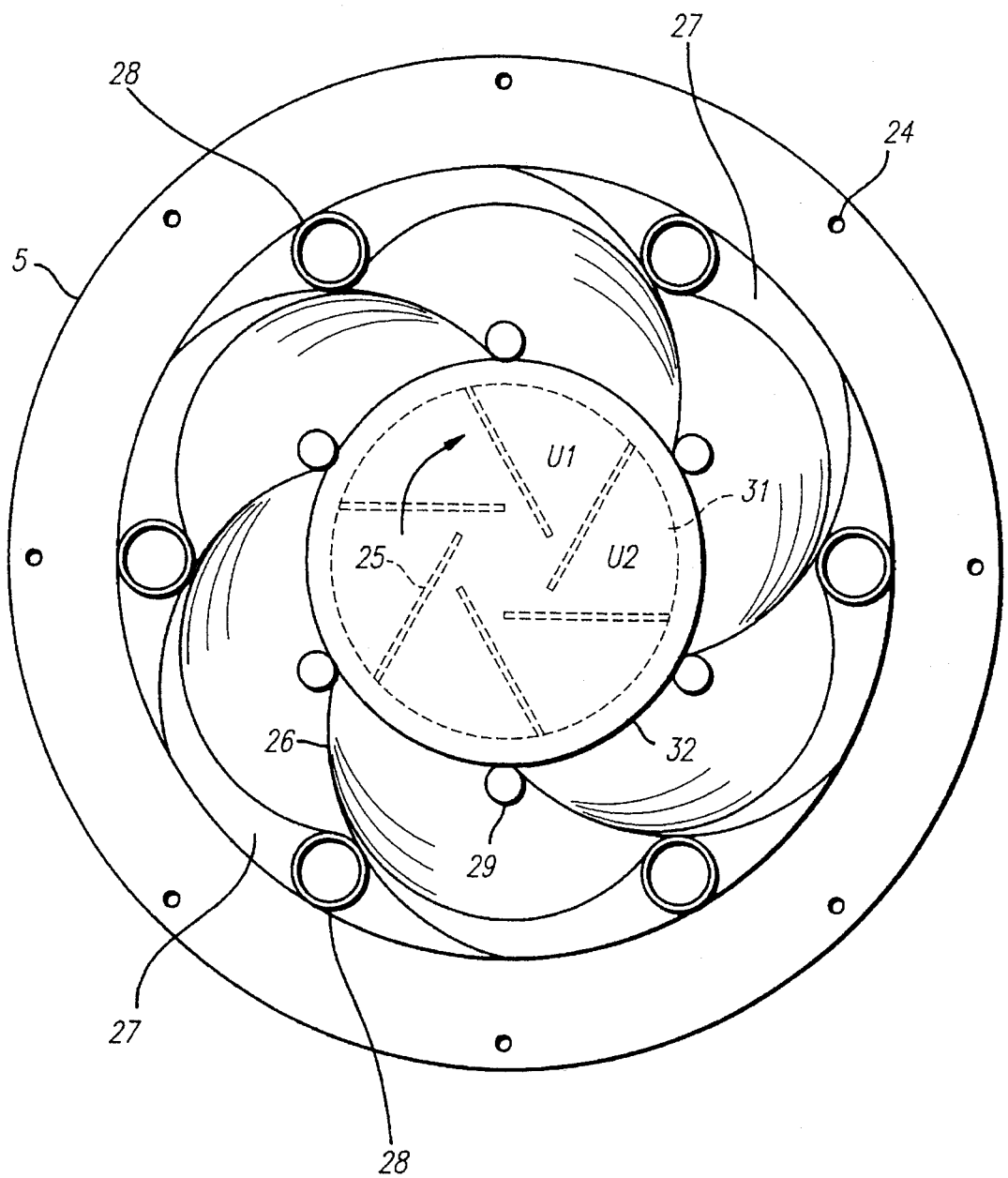
FIG. 3 shows a plan view of the defoamer of FIG. 1.

As shown in FIG. 2, the defoamer 5.2 is composed of a housing 33 arranged in the scrubber 5, which housing tapers at the top and the bottom. A suction fan is located centrally in this housing having a rotor 31 having rotor vanes 25 running tangentially to the direction of rotation of the rotor which are surrounded on the outside by stationary guide baffles 26 bent against the direction of rotation of the rotor. Beneath the defoamer 5.2 is located a bottom collecting tray 23, which is furnished with orifices 24 at the edge and the lower side of which is connected via outlet pipes 28 to the housing 33 of the defoamer. The outlet pipes 28 are arranged at the ends of the guide baffles 26 which face away from the rotor of the motor 32 of the defoamer. In the region of these guide baffles 26, the outlet pipes 28 are half cut away. The guide baffles 26 are covered at the top by crescent-shaped covering baffles 27, as shown in particular in FIG. 3.

Foam formed by the dynamic rollers 5.1 passes downwards along the exterior of the defoamer housing, as indicated by arrows. The foam is sucked into the interior of the defoamer housing 33 by the suction fan and accelerated radially outwards. The purified gas leaves at the top, while the reaction medium together with sludge and dense foam is passed via the vertical pipes through the bottom collecting tray 23 into the suction apparatus 6 located below and the receiver 5.3. Even before entry into the defoamer housing, reaction medium can accumulate together with sludge and passes via the orifices 24 in the collecting tray 23 into the receiver 5.3.

The dense foam and the reaction medium can be fed via the line 6.1 from the liquid surface in the receiver 5.3 to the gases to be purified and/or the dryer 1, as has been described with reference to FIG. 1.

Since the rotor blades are arranged tangentially, suction is produced over their rear side U1 and acceleration is produced over their front side U2, so that the foam to be broken is transported to the guide baffles 26. As a result of these processes, mechanical breaking of the foam into liquid, dense foam and purified gases takes place. The liquids, in particular, are passed via the outlet pipes 28 downwards into the receiver 5.3.

I claim:

1. A process for purification of a gas, comprising the steps of:

introducing a reaction medium, in concentrated form for pH regulation, into a reaction chamber;

contacting the gas with the foam-forming reaction medium in the reaction chamber;

defoaming the reaction medium in the reaction chamber;

collecting dense foam formed by the defoaming and the reaction medium mixed with water and gases;

removing the dense foam and surface sludge from the reaction chamber by suction;

holding the dense foam and surface sludge for gravity separation, whereby layering of substances to be separated is effected in a settling phase;

separating individual layers;

recovering the reaction medium; and withdrawing purified gas.

2. The process as claimed in claim 1, further comprising the step of feeding a further reaction medium into the reaction chamber, during the settling phase in which the layering is carried out.

3. A plant for carrying out purification of a gas, comprising:

a reaction chamber, in which the gas is contacted with a reaction medium by means of rotatable rollers, the reaction chamber having an inlet for the gas to be purified;

a receiver including an upper collecting tray beneath the rollers, onto which the reaction medium is passed and into which the rollers dip;

a defoamer arranged beneath the upper collecting tray and including a housing tapering at the top and the bottom;

an outlet channel for purified gas connected to the top of the housing and passing through the upper collecting tray;

a suction fan for sucking in and breaking the foam; and a separating device connected to the receiver for collection of dense foam and surface sludge and for discharge of layers formed from the dense foam and surface sludge by gravity separation, the separating device being provided with a measuring device to measure the specific gravity of each layer discharged and a rinsing device in order to rinse the separating device after the discharge of a layer.

4. The plant as claimed in claim 3, having a bottom collecting tray beneath the defoamer which is provided at the edge with through-holes and which is connected to the housing of the defoamer via outlet pipes.

5. The plant as claimed in claim 4, wherein the bottom collecting tray is arched upwards.

6. The plant as claimed in claim 3, wherein the suction fan of the defoamer is provided with a rotor having rotor blades tangential to the direction of rotation.

7. The plant as claimed in claim 6, wherein the rotor blades are surrounded by guide baffles bent against the direction of rotation of the rotor.

8. The plant as claimed in claim 7, wherein the guide baffles are covered by crescent-shaped covering baffles.

9. The plant as claimed in claim 7, wherein the outlet pipes are arranged at the ends of the guide baffles facing away from the rotor.

10. The plant as claimed in claim 9, wherein the outlet pipes, in the region of the guide baffles, are half cut away.

11. The plant as claimed in claim 3, further comprising a multi-stage dryer upstream of the inlet to the reaction chamber, said dryer having a central rotating pipe with a spiral guide baffle arranged therein for the dirty gas which is passed via outlet orifices in the rotating pipe onto individual stage trays and having a stationary wiper which transports the sludge located on the stage trays downwards via orifices in the stage trays.

12. The plant as claimed in claim 3, having deposition electrodes arranged in the reaction chamber in the region of the reaction medium for deposition of a material selected from the group consisting of metals, oxides and mixtures thereof.

13. The plant as claimed in claim 12, wherein the deposition electrodes are reversible.

14. The plant as claimed in claim 3, wherein the plant is designed as a mobile station mountable on a vehicle.

15. The plant as claimed in claim 14, wherein the dryer is mountable on a separate coupleable vehicle, so that the vehicle need only be transported when required.

* * * * *